(12) United States Patent
Angermayer et al.

(10) Patent No.: US 10,482,004 B2
(45) Date of Patent: Nov. 19, 2019

(54) TEST DATA FRAMEWORK (71) Applicant: SuccessFactors, Inc., South San Francisco, CA (US)

(72) Inventors: Thomas Angermayer, Stetten (DE); Bjoern Sanders, Speyer (DE)

(73) Assignee: SuccessFactors, Inc., South San Francisco, CA (US)

( * ) Notice: Subject to any disclaimer, the term of this patent is extended or adjusted under 35 U.S.C. 154(b) by 79 days.

(21) Appl. No.: 14/884,876

(22) Filed: Oct. 16, 2015

(65) Prior Publication Data

US 2017/0109269 A1 Apr. 20, 2017

(51) Int. Cl.
*G06F 11/36* (2006.01)
*G06F 16/22* (2019.01)

(52) U.S. Cl.
CPC ......... *G06F 11/3688* (2013.01); *G06F 16/22* (2019.01)

(58) Field of Classification Search
CPC .............................. G06F 11/3688; G06F 16/22
USPC ......................................................... 717/124
See application file for complete search history.

(56) References Cited

U.S. PATENT DOCUMENTS

| | | | | |
|---|---|---|---|---|
| 2004/0044494 A1* | 3/2004 | Muller | ................ | G06F 11/3664 702/123 |
| 2004/0044992 A1* | 3/2004 | Muller | ................ | G06F 11/3664 717/124 |
| 2005/0086193 A1* | 4/2005 | Bolstad | ............. | G06F 17/30569 |
| 2006/0161394 A1* | 7/2006 | Dulberg | ............. | G06F 11/0748 702/184 |
| 2010/0318974 A1* | 12/2010 | Hrastnik | ............. | G06F 11/3696 717/135 |
| 2011/0093435 A1* | 4/2011 | Zha | .................... | G06F 17/30566 707/639 |
| 2011/0321012 A1* | 12/2011 | Samantaray | .......... | G06F 11/368 717/122 |
| 2012/0030515 A1* | 2/2012 | Birakoglu | ............. | G06F 11/368 714/38.1 |
| 2013/0339792 A1* | 12/2013 | Hrastnik | ............. | G06F 11/3672 714/32 |
| 2016/0266921 A1* | 9/2016 | Mao | .................... | G06F 9/45558 |

OTHER PUBLICATIONS

Paepcke et al., "PCLOS: Stress Testing CLOS", 1990, ACM, p. 194-211.*

* cited by examiner

*Primary Examiner* — Emerson C Puente
*Assistant Examiner* — Sen Thong Chen
(74) *Attorney, Agent, or Firm* — Fountainhead Law Group P.C.

(57) ABSTRACT

Described herein is a test data framework. In accordance with one aspect, the framework creates a test data container that stores test data corresponding to one or more attributes of a business object. The framework may further create a test metaobject instance corresponding to the business object, wherein the test metaobject instance defines associations with the test data container and the business object. The test data container and the test metaobject instance may be sent to a test system for creating one or more instances of the business object that reflect the test data.

20 Claims, 6 Drawing Sheets

TEST DATA FRAMEWORK

TECHNICAL FIELD

The present disclosure relates generally to computer systems, and more specifically, to a test data framework.

BACKGROUND

Test data is used for testing a software application before the application is made available to customers. For example, for an enterprise resource planning (ERP) application, test data can include mock records of customers, accounts, orders, or any other entities that make up an underlying application data model. The test data enables a developer to test the software application under various test scenarios. Test data may be automatically generated or manually created by a user of an external tool, and uploaded to an application database. The same test data may be reused in different test systems, modules or instances. Test data is not only used to detect defects or failures in the software during manual tests, but is often used as a basis for regular automated tests. For these automated tests, it is very important that test data is up to date and stable in all systems in which these tests are executed.

In a system environment with several development and test systems, however, it is often complicated to move and adapt the test data from the development system to the test system. Existing test data management frameworks suffer from various issues. For example, the copy mechanism for cloning data may be unstable, resulting in side effects such as inconsistent data.

In most cases, a major challenge lies in synchronizing software development and test data maintenance. In the absence of synchronization, some test data may be outdated and lagging behind the software development process. Manual synchronization is typically error-prone and inefficient. Software development and data maintenance often take place independently of each other, which can cause inconsistencies that negatively impact tests, especially automated tests. In addition, software development tools typically support the main development process (e.g. transportation of software components), but not the distribution of test data to different development and test systems. Hard copying of test data may also cause negative side effects due to, for example, missing data that is created during data maintenance via a user interface (UI).

Another problem with present frameworks is that when test data is copied to a test system without delta handling, all other created data is lost. Such data includes, for example, master data records such as employee, organization management, etc. In addition, the test data may be manually changed in an uncontrolled manner, thereby resulting in failures in subsequent automatic or manual tests. To avoid this, a central team is often required to coordinate changes to the test data.

SUMMARY

A test data framework is described herein. In accordance with one aspect, the framework creates a test data container that stores test data corresponding to one or more attributes of a business object. The framework may further create a test metaobject instance corresponding to the business object, wherein the test metaobject instance defines associations with the test data container and the business object. The test data container and the test metaobject instance may be sent to a test system for creating one or more instances of the business object that reflect the test data.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A test data framework is described herein. In accordance with some implementations, an instance of a test metaobject is used to define test data for a specific business object. A test data container is a transportable object, and may be used to contain the test data for creating real instances of the business object in the system. The use of a test data container advantageously enables transporting of test data between software development and test systems. The test data may be made available in response to triggering of a refresh task for the affected business object. The activation logic in the system creates, updates and/or deletes instances of relevant test data entries in database tables after the test data container and test metaobject are transported to the test system. The trigger of these activities is the test metaobject. With this approach, it is possible to transport test data through the landscape and trigger business object activities.

The present framework provides an efficient and stable mechanism to transfer test data from the development system to the test system and synchronize the development process and test data. A refresh mechanism ensures that the test data is updated and synchronized with the software development process. The developer is provided with the capability to create both software code and test data together. The framework makes it possible for the developer to easily create new test data during an implementation of a new functionality or a bug fix (even hotfix). In addition, the central effort of managing test data is dramatically reduced.

It should be appreciated that the framework described herein may be implemented as a method, a report, a computer-controlled apparatus, a computer process, a computing system, or as an article of manufacture such as a computer-usable medium. These and various other features will be apparent from the following description. It should be further appreciated that the terms "client", "developer" and "user" may be used interchangeably as appropriate without departing from the scope of this disclosure.

Figure 1:
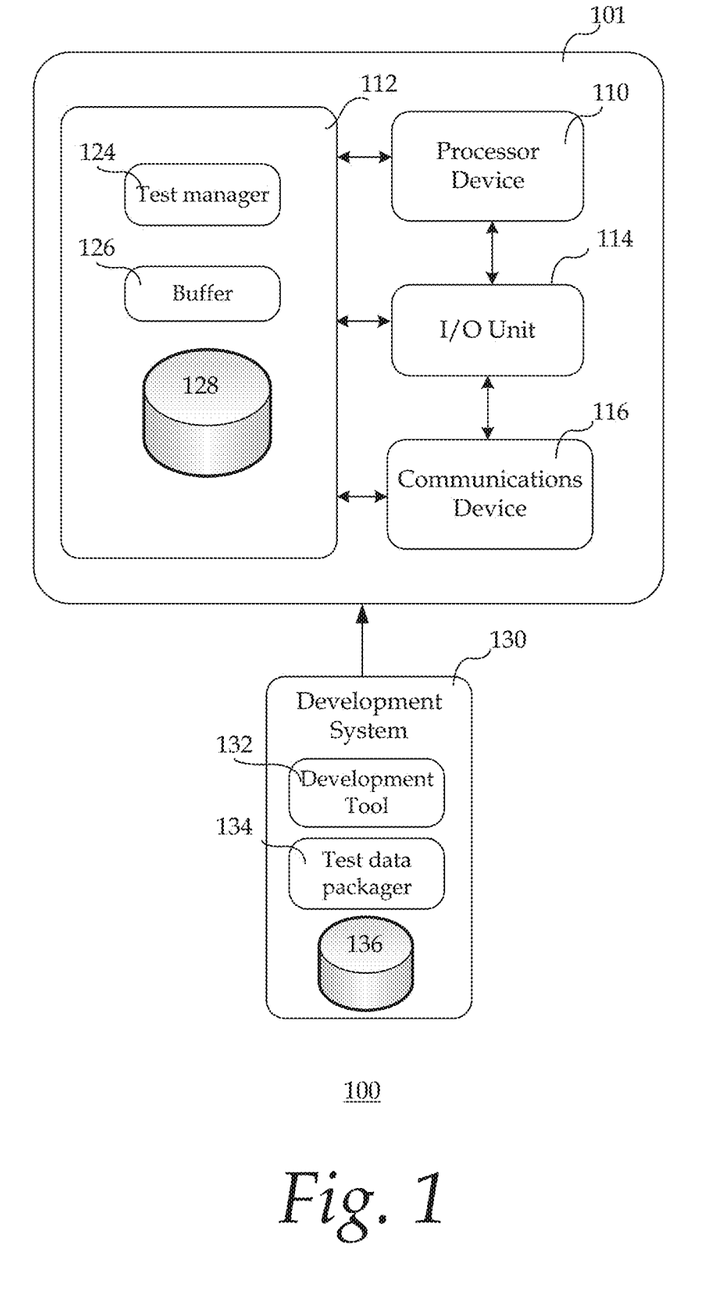
FIG. 1 is a block diagram illustrating an exemplary computer system.

FIG. 1 is a block diagram illustrating an exemplary architecture 100 in accordance with one aspect of the present framework. The architecture 100 includes a test system 101 communicatively coupled to a software development system 130. For illustration purposes, only one test system 101 is shown. However, it should be appreciated that multiple test systems 101 may be communicatively coupled to the development system 130. Test system 101 can be any type of computer device capable of responding to and executing instructions in a defined manner, such as a workstation, a server, a portable laptop computer, another portable device, a mini-computer, a mainframe computer, a storage system, a dedicated digital appliance, a device, a component, other equipment, or some combination of these. Test system 101 may include a processor device 110, an input/output (I/O) unit 114, a memory module 112 and a communications (or interface) device 116 (e.g., modem and/or network adapter) for exchanging data with a network (e.g., local area network (LAN), wide area network (WAN), Internet, etc.). It should be appreciated that the different components and sub-components of the test system 101 may be located or executed on different machines or systems. For example, a component may be executed on many computer systems connected via the network at the same time (i.e., cloud computing).

Memory module 112 of the computer system 100 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor device 110. As such, test system 101 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® SE, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 of test system 101 includes one or more components for implementing the techniques described herein, such as test manager 124, buffer 126 and database 128. It should be appreciated that some or all of these exemplary components may also be implemented in another computer system (e.g., user or client device). Test manager 124 serves to execute test scripts for testing a software application that is developed at, for example, the development system 130. Test manager also manages the test data associated with these test scripts. The test scripts and associated test data may be provided by development system 130. Buffer 126 is a region of memory module 112 that is used to temporarily store test data while it is being accessed during test execution. In some implementations, buffer 126 supports a fast search infrastructure (FSI) that provides tools for efficient searching of the database 128.

Development system 130 may include components (not shown) similar to the test system 101, such as a processor device, an I/O unit, a communications device and a memory module. Development system 130 may be any type of computer device capable of responding to and executing computer readable instructions in a defined manner, such as a workstation, a server, a portable laptop computer, another portable device, a mini-computer, a mainframe computer, a storage system, a dedicated digital appliance, a device, a component, other equipment, or some combination of these.

In addition, development system 130 may include a development tool 132, a test data packager 134 and a database 136. Development tool 132 provides a development environment to develop (e.g., create, modify, or analyze) code for a software application (e.g., business application such as an ERP system) or a business object using libraries, models and/or data stored in, for example, database 136. Test data packager 134 may provide a user interface to enable a developer or user to initiate creation of a test data container and test metaobject instances as described herein. Test data packager 134 then prepares the test data for transport to test system 101 for use in running tests on the software application. Development tool 132 and test data packager 134 may be integrated in a common environment to enable the developer to easily create and release test data during any stage of software development, such as during implementation of a new functionality or bug fix (e.g., hotfix).

Figure 2:
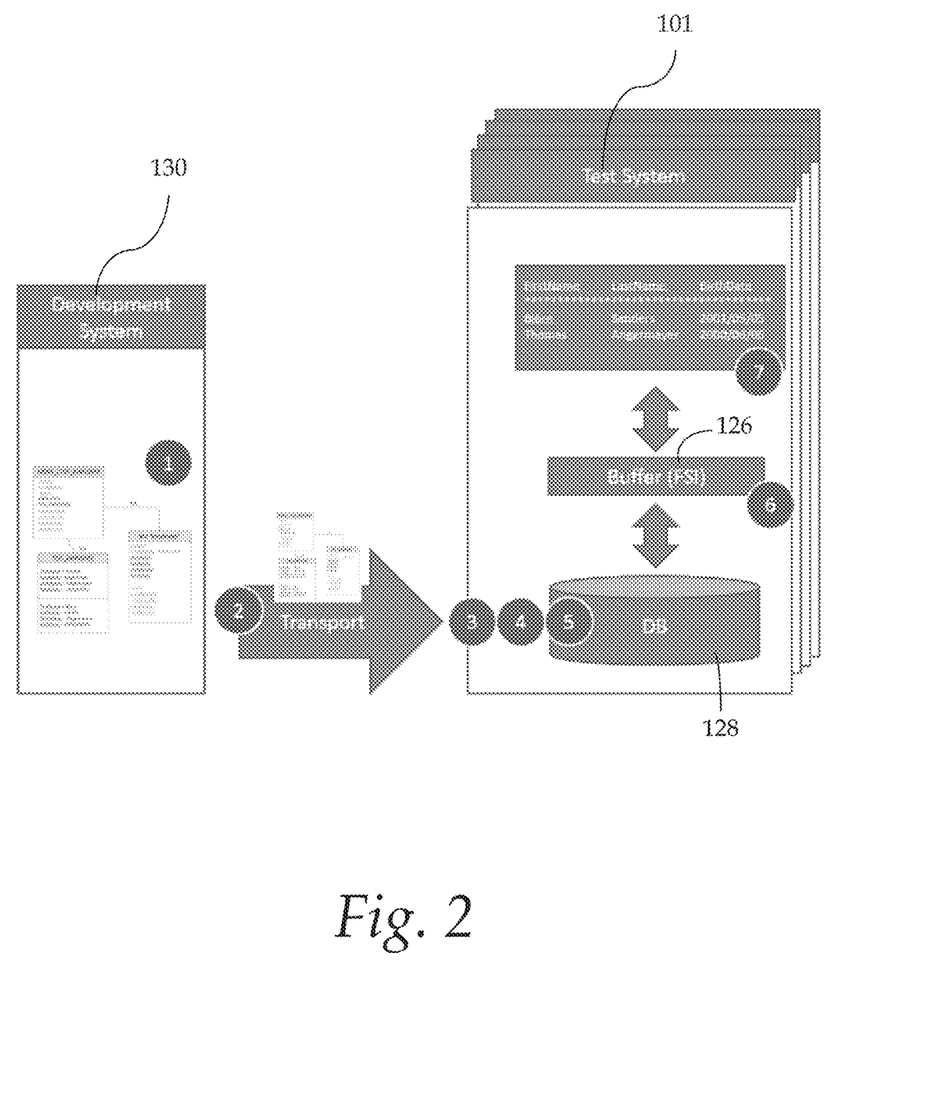
FIG. 2 illustrates exemplary steps performed at a development system and one or more test systems.

FIG. 2 illustrates exemplary steps performed at a development system 130 and one or more test systems 101. It should be noted that in the following discussion, reference will be made, using like numerals, to the features described in FIG. 1.

The steps are denoted by numbers 1-7 in FIG. 2. At step 1, a developer may create, via the test data packager 134, a test metaobject instance to define test data for a business object via a reference to a test data container and the business object. At step 2, the developer releases software code changes and test data via transport of the test data container and the test metaobject instance through a communications link. At step 3, the transport reaches the test system 101. At step 4, the test metaobject instance is activated by the test manager 124. At step 5, test manager 124 copies relevant test data from the test data container to the database 128. At step 6, the buffer 126 is refreshed with data from the database 128. At step 7, test data from the buffer is available on standard user interfaces (UIs) and can be used by manual and automated tests executed by test manager 124.

Figure 3:
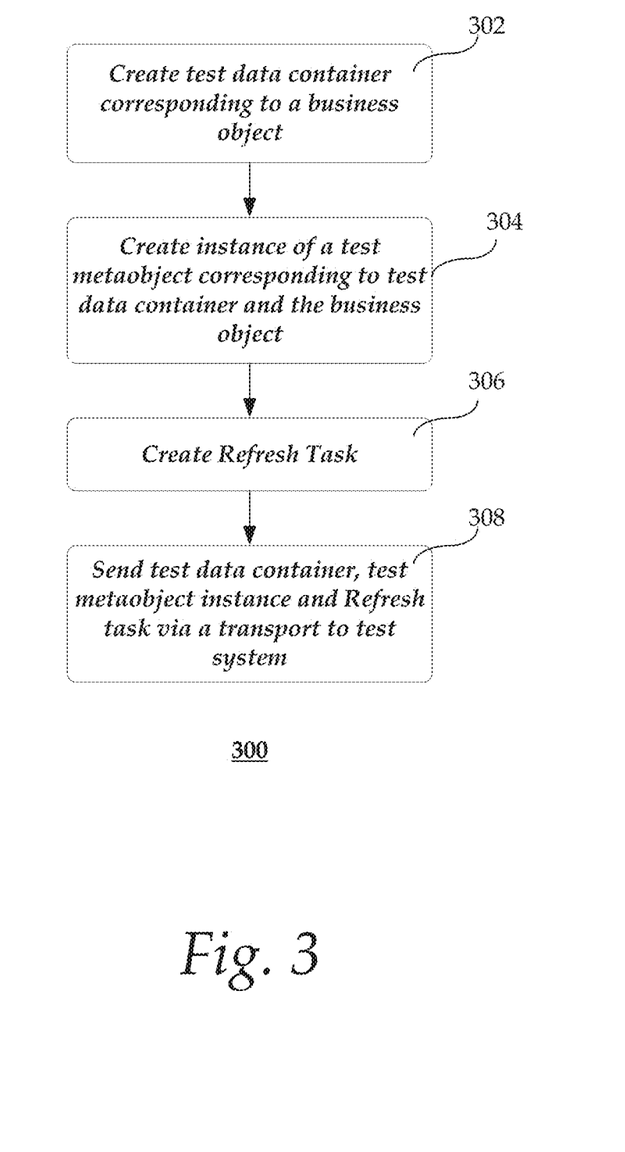
FIG. 3 shows an exemplary method of distributing test data.

FIG. 3 shows an exemplary method 300 of distributing test data. The method 300 may be performed automatically or semi-automatically by the development system 130, as previously described with reference to FIGS. 1 and 2. It should be noted that in the following discussion, reference will be made, using like numerals, to the features described in FIGS. 1 and 2.

At 302, test data packager 134 creates a test data container corresponding to a specific business object. The test data container may be created in response to, for example, user input via a user interface. A "business object" refers to an entity within a software application that holds a set of attributes and associations with other business objects, weaving a map of objects representing business relationships (e.g., Employee-Employer). The test data container is a transportable object that organizes test data that can be used within, for example, test system 101 for creating instances of the business object and executing one or more tests. All relevant test data corresponding to one or more attributes of the business object is persisted in the test data container.

The test data container may store various mandatory attributes, such as title, unique identifier (id), package, creation date, creation user, etc. In addition, the test data container may store a parameter for each database table in the business object. The data type of the parameter may be defined as a database table. For example, the parameters may be defined as follows:

Parameter P_MIN_D_ROOT_ST with datatype MIN_D_ROOT_ST

Parameter P_IRU_D_KEYMAP with datatype IRU_D_KEYMAP wherein P_MIN_D_ROOT_ST and P_IRU_D_KEYMAP are the parameter names and MIN_D_ROOT_ST and IRU_D_KEYMAP are the respective database tables. For each database table in the business object, one parameter may be defined in the test data container. The parameters may be required to persist the test data in the test data container.

At 304, test data packager 134 creates an instance of a test metaobject corresponding to the test data container and the business object. The test metaobject instance may be created and activated in response to, for example, user input via a user interface. A "test metaobject" refers to an object that contains test-related information and describes other entities, such as a business object and test data container for use in software testing. For each business object that needs test data, an instance of the test metaobject and the corresponding test data container are created. The test metaobject instance is stateless and can be used to trigger different activities. The test metaobject may define associations with (or pointers to) the test data container and the business object. Further, the test metaobject may define an association to a text document containing instructions to guide developers in providing relevant information (e.g., which test metaobject instance can be used in which test case or scenario).

Figure 4:
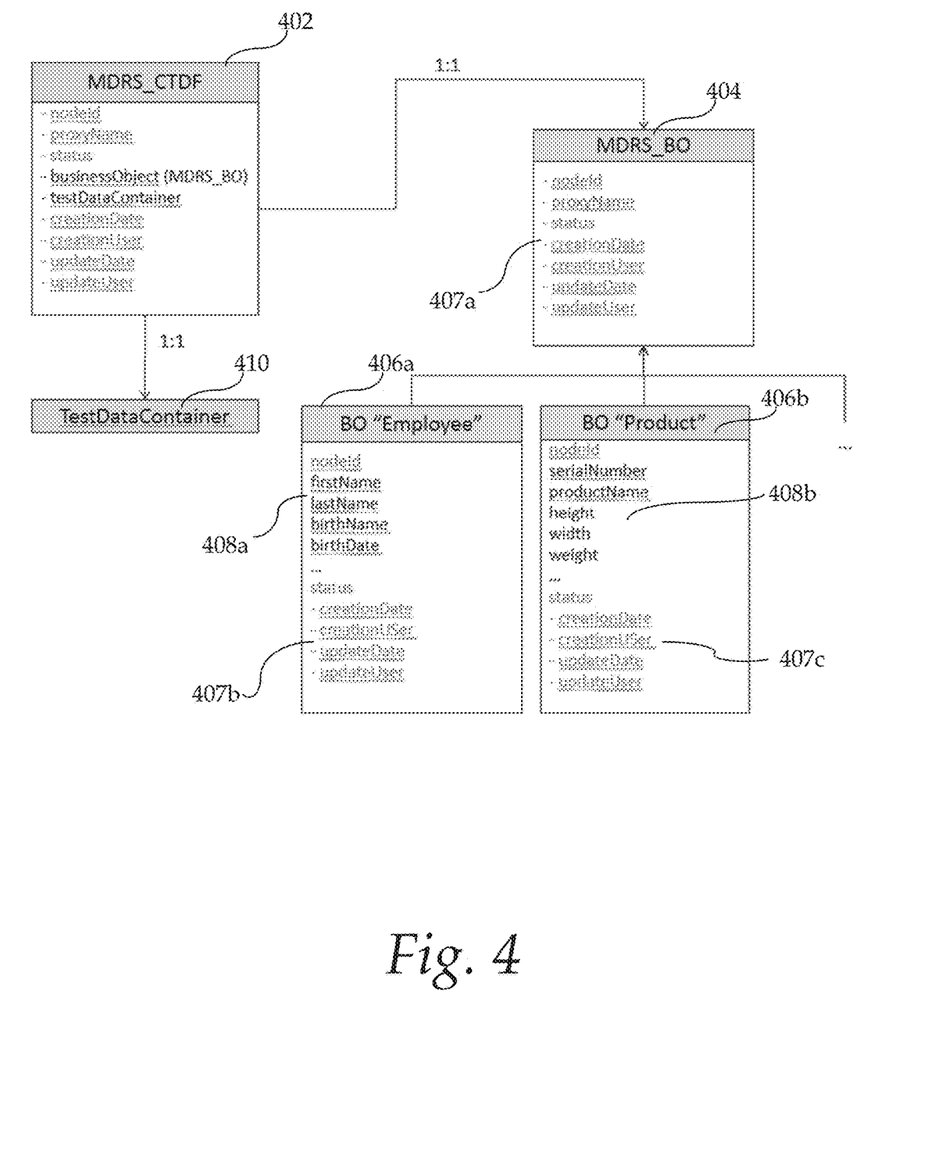
FIG. 4 shows exemplary test data container and test metaobject instances.

FIG. 4 shows exemplary test data container and test metaobject instances that can be created by test data packager 134. MDRS_CTDF 402 is a test metaobject instance. MDRS_CTDF 402 has only one ROOT node that holds all mandatory attributes for test metaobjects, such as node identifier, proxy name, status, creation date, creation user, update date, update user, etc. In addition, MDRS_CTDF includes associations with business object MDRS_BO 404 and TestDataContainer 410. Business object MDRS_BO 404 is referenced by dependent business objects Employee 406a and Product 406b. Each business object (404 and 406a-b) contains mandatory attributes 407a-c, such as node identifier, proxy name, status, creation date, creation user, update date and update user. Mandatory attributes 407a-c may be the same for all business objects and test metaobject instances. Business object Employee 406a further includes specific attributes 408a (e.g., first name, last name, birth name, birth date, etc.) and business object Product 406b further includes specific attributes 408b (e.g., serial number, product name, height, width, weight, etc.). Specific attributes 408a-b are specific to the particular business object type, and may be different for different types of business objects.

Figure 5:
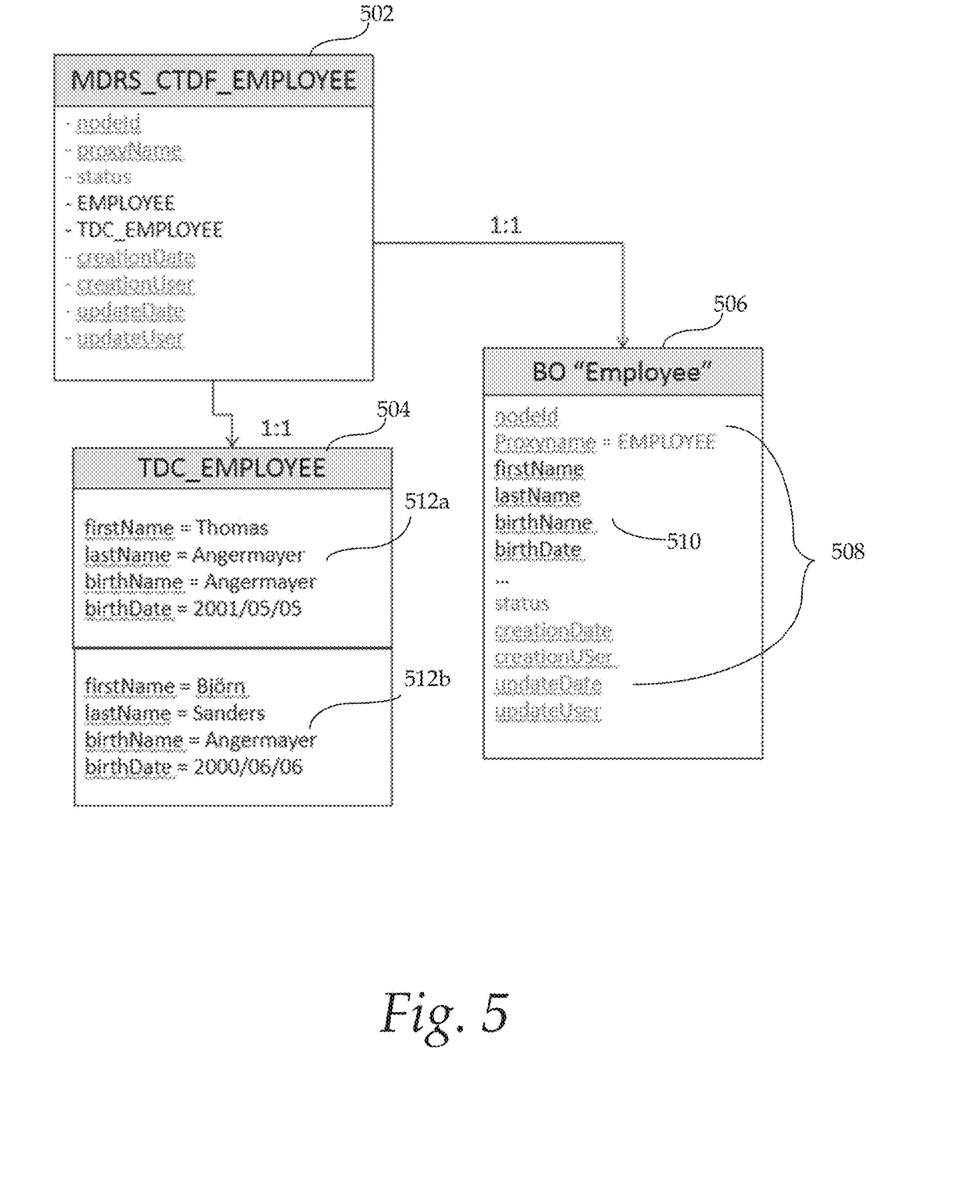
FIG. 5 shows another exemplary test data container and test metaobject instances.

FIG. 5 shows another exemplary test data container and test metaobject instances that can be created by test data packager 134. As shown, the test metaobject instance MDRS_CTDF_EMPLOYEE 502 is associated with (or points to) test data container TDC_EMPLOYEE 504 and business object Employee 506. Business object "Employee" 506 includes mandatory attributes 508 (e.g., nodeID, proxyName, status, etc.) as well as specific attributes 510 (e.g., first name, last name, birth name, birth date, etc.). Test data values 512a-b corresponding to the relevant specific attributes 510 may be persisted in test data container TDC_EMPLOYEE 504. For example, two sets of test data values 512a-b may be persisted in test data container 504 to create two different "Employee" business object instances. The test data values 512a-b may be retrieved from, for example, database 136 or from the developer via a user interface.

Returning to FIG. 3, at 306, test data packager 134 creates a Refresh task that updates a test system 101 with test data. The Refresh task may be created in the background while the test metaobject instances and/or test data container are created. The Refresh task is a function that updates the buffer 126 with data from the database 128 at the test system 101. The Refresh task may be configured to be triggered (or run) periodically or at a predetermined time.

At 308, test data packager 134 sends the test metaobject instance, the test data container and the Refresh task to test system 101 via, for example, a transport. A transport is a package that is used to transfer data from one system to another. The transport may be generated and released in response to, for example, an indication received from, for example, the developer, via a user interface that code changes are to be released.

In some implementations, the method 300 is implemented in the form of an executable program (e.g., SAP report) that reads the test data from the database and generates the test metaobject and test data container instances. The program may run in a development system that is, for example, a common test data framework (CTDF) client. The program may create a test data container for each business object, retrieve test data from the database tables, fill the test data containers with the test data and create instances of the test metaobject in accordance with the aforementioned method 300. All test metaobject instances and test data containers may be collected in a single or multiple transports. With the release of such one or more transports, the test data is available to all test systems.

Figure 6:
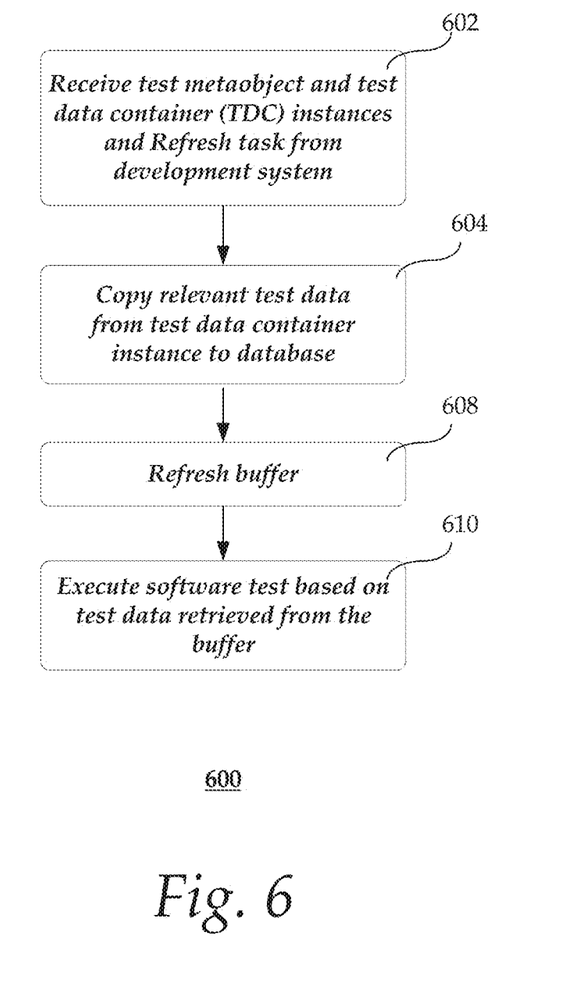
FIG. 6 shows an exemplary method of assimilating the test data.

FIG. 6 shows an exemplary method 600 of assimilating the test data. The method 600 may be performed automatically or semi-automatically by the test system 101, as previously described with reference to FIGS. 1 and 2. It should be noted that in the following discussion, reference will be made, using like numerals, to the features described in FIGS. 1 and 2.

At 602, test manager 124 receives test metaobject and test data container (TDC) instances, as well as the Refresh task, from development system 130. As discussed previously, such data may be contained in a Transport.

At 604, test manager 124 copies the relevant test data from the test data container instance referenced by the test metaobject instance to the database 128 for each client. This may be performed in response to activation of the test metaobject instance. Each instance of the test metaobject may be activated. The test metaobject instance may be activated by calling, for example, a function module. When the test metaobject instance is activated, it becomes available to provide data. It is also possible to modify (e.g., Update or Delete) the test data in the database 128 if allowed.

In some implementations, the test manager 124 maintains the stability of the test data in the database 128 by ensuring that test data is not changed. The owner of the business object may indicate the test data is not to be changed by manually applying for a 'not changeable' pattern to be written into the database 128. Such pattern identifier (ID) may be set to, for example, a first predetermined pattern (e.g., MC*). The node identifiers of data instances may be set to a second predetermined pattern (e.g., CCC**********). When a change is triggered, the framework checks the node identifier of each data instance that the user seeks to modify to determine if it matches the first predetermined pattern. If so, the modification request is rejected. To prevent any changes to the database 128, the test manager 124 may automatically set the second predetermined pattern to one that is different from the first predetermined pattern to indicate that it is not changeable. This mechanism advantageously removes the need for developers to manually maintain the database 128, and provides a reliable way to automatically protect the test data in the database 128 from modification.

At 608, the Refresh task is triggered to refresh or update the buffer 126 with the relevant test data from the database 128. After the Refresh task is completed, the data in the buffer 126 and the data in the database 128 are the same.

At 610, the test manager 124 executes a software application test based on the test data. Such test data may be retrieved from the buffer 126 via, for example, a normal search infrastructure. The test data may be made available on standard UIs, and be used by manual or automated software tests during runtime. In some implementations, the test data is used to create one or more instances of the associated business object that reflect (or contain) the test data. The software application test may then be performed on such business object instances.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A non-transitory machine-readable medium storing a program executable by at least one processing unit of a device, the program comprising sets of instructions for:
   creating a test data container comprising a first set of values for a set of attributes of a business object and a second set of values for the set of attributes of the business object;
   creating an instance of a test metaobject associated with the business object, the instance of the test metaobject comprising a first reference to the test data container and a second reference to the business object; and
   sending a test system the test data container and the instance of the test metaobject, wherein the test system creates a first instance of the business object based on the first set of values in the test data container and a second instance of the business object based on the second set of values in the test data container.

2. The non-transitory machine-readable medium of claim 1, wherein the program further comprises a set of instructions for sending the test system a set of test scripts.

3. The non-transitory machine-readable medium of claim 2, wherein the test system executes the set of test scripts using the first instance of the business object and the second instance of the business object in order to test an application operating on the test system.

4. The non-transitory machine-readable medium of claim 3, wherein the application is developed at the device.

5. The non-transitory machine-readable medium of claim 1, wherein the test data is a first test data, wherein the set of attributes of the business object is a first set of attributes of a first business object, wherein the test data container is a first test data container, wherein the program further comprises sets of instructions for:
   creating a second test data container comprising a third set of values for a second set of attributes of a second business object and a fourth set of values for the second set of attributes of the second business object;
   creating a second instance of a test metaobject associated with the second business object, the second instance of the test metaobject comprising a first reference to the second test data container and a second reference to the second business object; and
   sending the test system the second test data container and the second instance of the test metaobject in order for the test system to create a first instance of the second business object based on the third set of values in the second test data container and a second instance of the second business object based on the fourth set of values in the test data container.

6. The non-transitory machine-readable medium of claim 1, wherein the test data is a first test data, wherein the set of attributes of the business object is a first set of attributes of a first business object, wherein the test data container is a first test data container, wherein the test system is a first test system, wherein the program further comprises sets of instructions for:
   creating a second test data container comprising a third set of values for a second set of attributes of a second business object and a fourth set of values for the second set of attributes of the second business object;
   creating a second instance of a test metaobject associated with the second business object, the second instance of the test metaobject comprising a first reference to the second test data container and a second reference to the second business object; and
   sending a second test system the second test data container and the second instance of the test metaobject in order for the second test system to create a first instance of the second business object based on the third set of values in the second test data container and a second instance of the second business object based on the fourth set of values in the test data container.

7. The non-transitory machine-readable medium of claim 1, wherein sending the test system the test data container and the instance of the test metaobject comprises sending the test system a single package that includes the test data container and the instance of the test metaobject.

8. A method comprising:
   creating a test data container comprising a first set of values for a set of attributes of a business object and a second set of values for the set of attributes of the business object;
   creating an instance of a test metaobject associated with the business object, the instance of the test metaobject comprising a first reference to the test data container and a second reference to the business object; and
   sending a test system the test data container and the instance of the test metaobject, wherein the test system creates a first instance of the business object based on the first set of values in the test data container and a second instance of the business object based on the second set of values in the test data container.

9. The method of claim 8 further comprising sending the test system a set of test scripts.

10. The method of claim 9, wherein the test system executes the set of test scripts using the first instance of the business object and the second instance of the business object in order to test an application operating on the test system.

11. The method of claim 8, wherein the test data is a first test data, wherein the set of attributes of the business object is a first set of attributes of a first business object, wherein the test data container is a first test data container, wherein the method further comprises:
   creating a second test data container comprising a third set of values for a second set of attributes of a second business object and a fourth set of values for the second set of attributes of the second business object;
   creating a second instance of a test metaobject associated with the second business object, the second instance of the test metaobject comprising a first reference to the second test data container and a second reference to the second business object; and
   sending the test system the second test data container and the second instance of the test metaobject in order for the test system to create a first instance of the second business object based on the third set of values in the second test data container and a second instance of the second business object based on the fourth set of values in the test data container.

12. The method of claim 8, wherein the test data is a first test data, wherein the set of attributes of the business object is a first set of attributes of a first business object, wherein the test data container is a first test data container, wherein the test system is a first test system, wherein the method further comprises:
   creating a second test data container comprising a third set of values for a second set of attributes of a second business object and a fourth set of values for the second set of attributes of the second business object;
   creating a second instance of a test metaobject associated with the second business object, the second instance of the test metaobject comprising a first reference to the second test data container and a second reference to the second business object; and
   sending a second test system the second test data container and the second instance of the test metaobject in order for the second test system to create a first instance of the second business object based on the third set of values in the second test data container and a second instance of the second business object based on the fourth set of values in the test data container.

13. The method of claim 8, wherein sending the test system the test data container and the instance of the test metaobject comprises sending the test system a single package that includes the test data container and the instance of the test metaobject.

14. A system comprising:
   a set of processing units; and
   a non-transitory machine-readable medium storing instructions that when executed by at least one processing unit in the set of processing units cause the at least one processing unit to:
      create a test data container comprising a first set of values for a set of attributes of a business object and a second set of values for the set of attributes of the business object;
      create an instance of a test metaobject associated with the business object, the instance of the test metaobject comprising a first reference to the test data container and a second reference to the business object; and
      send a test system the test data container and the instance of the test metaobject, wherein the test system creates a first instance of the business object based on the first set of values in the test data container and a second instance of the business object based on the second set of values in the test data container.

15. The system of claim 14, wherein the instructions further cause the at least one processing unit to send the test system a set of test scripts.

16. The system of claim 15, wherein the test system executes the set of test scripts using the first instance of the business object and the second instance of the business object in order to test an application operating on the test system.

17. The system of claim 16, wherein the application is developed at the device.

18. The system of claim 14, wherein the test data is a first test data, wherein the set of attributes of the business object is a first set of attributes of a first business object, wherein the test data container is a first test data container, wherein the instructions further cause the at least one processing unit to:
   create a second test data container comprising a third set of values for a second set of attributes of a second business object and a fourth set of values for the second set of attributes of the second business object;
   create a second instance of a test metaobject associated with the second business object, the second instance of the test metaobject comprising a first reference to the second test data container and a second reference to the second business object; and
   send the test system the second test data container and the second instance of the test metaobject in order for the test system to create a first instance of the second business object based on the third set of values in the second test data container and a second instance of the second business object based on the fourth set of values in the test data container.

19. The system of claim 14, wherein the test data is a first test data, wherein the set of attributes of the business object is a first set of attributes of a first business object, wherein the test data container is a first test data container, wherein the test system is a first test system, wherein the instructions further cause the at least one processing unit to:
   create a second test data container comprising a third set of values for a second set of attributes of a second business object and a fourth set of values for the second set of attributes of the second business object;

create a second instance of a test metaobject associated with the second business object, the second instance of the test metaobject comprising a first reference to the second test data container and a second reference to the second business object; and send a second test system the second test data container and the second instance of the test metaobject in order for the second test system to create a first instance of the second business object based on the third set of values in the second test data container and a second instance of the second business object based on the fourth set of values in the test data container.

20. The system of claim 14, wherein sending the test system the test data container and the instance of the test metaobject comprises sending the test system a single package that includes the test data container and the instance of the test metaobject.

* * * * *